United States Patent [19]

Walker et al.

[11] 4,076,913

[45] Feb. 28, 1978

[54] SOLID OR GEL POLYMERS CONTAINING A PLURALITY OF FREE HYDRAZONE GROUPS

[75] Inventors: Derek Walker, Windermere; Philip Howard Chapman, Ulverston, both of England

[73] Assignee: Glaxo Laboratories Limited, United Kingdom

[21] Appl. No.: 726,784

[22] Filed: Sep. 27, 1976

Related U.S. Application Data

[63] Continuation of Ser. No. 597,675, Jun. 21, 1975, abandoned, which is a continuation-in-part of Ser. No. 493,051, Jul. 30, 1974, Pat. No. 4,038,469.

[30] Foreign Application Priority Data

Jul. 31, 1973  United Kingdom ............... 36384/73

[51] Int. Cl.$^2$ .................... C08F 236/00; C08F 210/00; C08C 19/12; C08G 2/00
[52] U.S. Cl. ..................................... 526/19; 260/2 R; 260/2.5 HB; 260/8; 260/63 BB; 260/63 N; 260/63 R; 260/66; 260/67 UA; 260/77.5 AQ; 260/79.5 C; 260/141; 260/875; 526/14; 526/16; 526/20; 526/21; 526/23; 526/30; 526/43; 526/46; 526/49; 526/51; 526/54

[58] Field of Search ............... 526/20, 19; 260/63 BB, 260/67 FP, 2 R, 2.5 HB, 8, 63, , 66, 67, 77.5, 79.5, 141, 875

[56] References Cited

FOREIGN PATENT DOCUMENTS

| 497,031 | 12/1938 | United Kingdom. |
| 793,292 | 4/1958 | United Kingdom. |
| 839,377 | 6/1960 | United Kingdom. |
| 864,874 | 4/1961 | United Kingdom. |
| 1,046,464 | 10/1966 | United Kingdom. |
| 1,322,698 | 7/1973 | United Kingdom. |
| 1,337,870 | 11/1973 | United Kingdom. |

*Primary Examiner*—Herbert J. Lilling

[57] ABSTRACT

Novel polymers are provided which carry diazomethylene or hydrazonomethylene groups. Such polymers are of special use in immobilising carboxylic acids, such as amino acids, with a view to subsequent chemical transformation of such acids, e.g. peptide synthesis. Alcohols and thiols may also be immobilised using the new polymers. Methods for the preparation of the polymers are provided, starting from a variety of polymer types.

8 Claims, No Drawings

SOLID OR GEL POLYMERS CONTAINING A PLURALITY OF FREE HYDRAZONE GROUPS

RELATED APPLICATION

This is a continuation of application Ser. No. 597,675, filed June 21, 1975, and now abandoned, which in turn is a continuation-in-part of application Ser. No. 493,051, filed July 30, 1974, now U.S. Pat. No. 4,038,469.

This invention is concerned with improvements in or relating to polymers possesing reactive groups.

Increasing interest has recently been shown in the preparation and use of reactive polymers i.e. polymers containing reactive groups, and a variety of applications have been proposed for such materials. Thus, for example, it has been shown that appropriately substituted reactive polymers can be used in peptide synthesis in a process involving binding of an N-blocked amino acid to such a polymer, removing the N-blocking group to make available the free amino group and using a simple series of reactions to convert the polymer-bound amino acid into a polymer-bound peptide. Chemical processes involving this type of manipulation are referred to herein for convenience as polymer-supported syntheses.

Reactive polymers are also of value in the immobilisation of both reagents and catalysts used for chemical reactions. The technique of using polymer-immobilised reagents or catalysts is of value in that, inter alia, contamination of the reaction product by the reagent or catalyst is minimised. Reactive polymers may also be of value in the preparation of ion exchange resins by immobilising ionic reagents.

A further application of reactive polymers is in the production of graft polymers in which the reactive polymer may be used as or as part of the base polymer upon which covalently linked pendant chains are sited.

We have now discovered a novel class of reactive polymers which are powerful alkylating agents. The characteristic feature of the polymers according to the invention is that they possess a plurality of diazomethylene groups. A diazomethylene group has the structure $-CN_2-$ and our novel polymers are referred to herein for convenience as polymer diazomethylenes.

Polymer diazomethylenes according to the invention undergo rapid and efficient reaction under mild conditions with a wide range of substrate materials by virtue of the high activity of the diazomethylene groups. This is in contrast with other alkylating reactive polymers, e.g. styrene-based polymers containing nuclear chloromethyl groups as reactive substituents, where the comparatively low activity of the reactive substituents frequently necessitates vigorous reaction conditions to promote polymer-substrate interactions. Even when vigorous conditions and long reaction times are used the yields of polymer-bound substrate are frequently low with such chloromethylated polymers.

Because of the above limitations of known alkylating reactive polymers, particularly the yield limitations, polymer-supported synthesis has attracted little commercial interest. In order to justify the use of polymer supports in industry it is necessary to employ reactive polymers which react efficiently, preferably under mild conditions, and which can give high loadings of the polymer-based substrate. These requirements are satisfied by the reactive polymers of the present invention.

Each diazomethylene group in the polymer diazomethylenes of the invention may form part of the polymer backbone chain, either joining two separate units, which may be the same or different or forming part of a bivalent component which may be a unit of the polymer chain; preferably, however, each diazomethylene group is part of a side-chain attached to the polymer backbone. In the latter case, each diazomethylene group will be bonded to the polymer backbone through one of its two valencies, either directly or through a bivalent linking group, while being bonded through the second valency to a hydrogen atom or a substituent atom or group, advantageously an organic substituting group. Suitable organic substituting groups include alkyl groups containing 1-20 carbon atoms, e.g. lower alkyl groups, preferably containing 1-6 carbon atoms, such as methyl, ethyl, n-propyl or isopropyl; cycloalkyl groups, preferably containing 5-7 carbon atoms in the ring, e.g. cyclopentyl or cyclohexyl; aryl groups such as phenyl or naphthyl; aralkyl groups, preferably containing a monocyclic aryl ring and containing 1-6 carbon atoms in the alkyl portion, such as benzyl; 5- or 6- membered heterocyclic rings containing one or more heteroatoms selected from O, N and S, e.g. 2-thienyl, 2-furyl, 2-pyridinyl etc; heterocyclic-substituted alkyl groups, preferably containing a heterocyclic ring as defined above and containing 1-6 carbon atoms in the alkyl portion, e.g. 2-thienylmethyl, 2-furylmethyl etc; unsaturated analogues of the above groups, e.g. lower alkenyl such as vinyl or allyl, cycloalkenyl such as cyclohexenyl or cyclopentadienyl, and carbocyclic or heterocyclic aryl-substituted alkenyl; or any of the preceding groups substituted by one or more halogen atoms, cyano, nitro, sulphone, oxo, esterified carboxy, alkyl or alkoxy groups, the alkyl group of these last substituents preferably containing 1-6 carbon atoms, suitable substituents thus including methyl, ethyl, n-propyl, isopropyl, methoxy, ethoxy, isopropoxy, etc. Suitable groups for linking the diazomethylene groups to the polymer backbone include, for example, bivalent analogues of the above organic substituting groups, e.g. alkylene groups such as methylene, ethylene, propylene or butylene, and arylene groups such as phenylene, e.g. p-phenylene.

For certain applications of the polymer diazomethylenes of the invention it is preferred that the diazomethylene group be bonded to at least one aromatic group, e.g. an aryl group such as phenyl or phenyl substituted by, for example, nitro, alkyl e.g. methyl or t-butyl, or alkoxy e.g. methoxy or ethoxy or halo e.g. chloro or bromo, or cyano or an aromatic heterocyclic group, e.g. one of the heterocyclic groups listed above; since in many instances the proximity of such an aromatic group will facilitate subsequent hydrolytic or hydrogenolytic cleavage of substrates bound to the polymer. Mono- or poly-alkoxyphenyl groups are especially effective in facilitating such cleavage, particularly under acid conditions. The diazomethylene groups may be bonded through one or both valencies to aromatic groups present in the repeating units of the polymer backbone or may be attached to the polymer chains through bivalent aromatic linking groups. Alternatively, the diazomethylene groups may each be bonded through one valency to aromatic organic substituting groups, being attached directly or indirectly through the other valency to the polymer chain, advantageously to an aromatic group so that the diazomethylene groups are attached to aryl groupings through both valencies.

More than one type of diazomethylene group may be present in the polymers of the invention. Thus, for example, a polymer diazomethylene may contain diazomethylene groups both in the backbone and in side chains attached to the backbone.

The polymer diazomethylenes may be derived from a wide range of polymeric systems, including both solid and liquid homopolymers and copolymers, including cross-linked structures which may be, for example, of the gel or macroreticular type. Solid polymer diazomethylenes may be prepared either in particulate form or as preformed structures with or without a mechanical support. Suitable preformed structures thus include filaments, films, membranes, tubes, coated wires, coated tubes etc. Particulate and filamentary polymer diazomethylenes may often with advantage be employed in columns. It will be appreciated that the basic polymer system employed in a given instance should desirably be chemically and physically stable under the conditions in which it is intended to use the polymer diazomethylene.

In general we prefer to use a polymeric system in which the polymer backbone is composed entirely of carbon atoms since such a polymer is unlikely to be subject to degradation during use of the polymer diazomethylene. Such polymeric systems may be produced in the usual way by polymerisation of olefinically unsaturated monomers. One useful class of polymer diazomethylenes in accordance with the invention comprises polymers containing units derived from styrene; advantageously these polymers are cross-linked to a small extent (e.g. 0.1–8%, e.g. from 0.1–5%, preferably about 1–2%) by polymerisation in the presence of a cross-linking agent such as divinylbenzene. Such polystyrenes, e.g. polystyrene - 2% divinylbenzene copolymer, are readily available commercially and may be used to prepare highly reactive polymer diazomethylenes having advantageous properties as regards storage life and stability of the polymer chain during subsequent reactions of polymer-bound substrates. When a macroreticular polystyrene divinylbenzene is used, the degree of cross-linking may be higher.

Another useful class of polymer diazomethylenes are based on polymers of acrylic, methacrylic and vinyl ester monomers. Such polymers may be obtained by polymerising acrylic or methacrylic acid esters, amides or nitriles or the free acids themselves and vinyl acetate or vinyl propionate.

The side chains of such polymers can be converted into diazomethylene derivatives by the methods described hereinafter. By copolymerising such monomers with an unfunctionalised monomer such as styrene, the percentage of active diazomethylene groups in the final polymer can be accurately controlled.

Another useful class of polymer diazomethylenes are those derived from poly (benzoyl) which may be obtained by oxidation of poly (benzyl) which has the repeating unit ($-CH_2-$ phenyl-); in this case the diazomethylene groups form part of the backbone chain of the polymer.

A still further class of useful polymer diazomethylenes are those based on polymers of vinyl ketones. Where the vinyl ketones are purely aliphatic the eventual diazomethylene groups will be directly attached only to aliphatic groups. Such vinyl ketones can however usefully be copolymerised with aromatic monomers such as styrene.

Although polymeric systems in which the polymer backbone is composed entirely of carbon atoms are preferred by reason of the versatility of polymer diazomethylenes prepared therefrom, polymeric systems in which the backbone contains other atoms in addition to carbon for example oxygen, sulphur and nitrogen may also be useful. One may thus use, as the polymeric system a polyester, polyamide or polyurethane. Furthermore the polymer backbone may be entirely composed of atoms other than carbon such as are frequently found in inorganic polymers. Thus the polymer backbone may contain collections of atoms selected from oxygen, nitrogen, silicon, phosphorus and aluminum. Examples of such systems are polysiloxanes substituted by organic groups for example polymethylphenylsiloxane.

It will be appreciated that the essential characteristic of our invention is the association of a plurality of diazomethylene groups with a large supporting molecule. The function of the diazomethylene groups is to provide a source of alkylating centres whilst the function of the supporting molecule is simply to provide a structure which is insoluble in the intended reagent systems which provides points of anchorage for the diazomethylene groups. Provided the supporting molecule fulfills these requirements and continues to fulfill them during any use of the polymer diazomethylene it can be considered to be a satisfactory polymeric system.

The polymeric system may therefore be chosen according to the envisaged use of the diazomethylene. Thus, while polyesters, polyamides and polyurethanes might all be polymeric systems that are more prone to degradation reactions than polymeric systems in which the polymer backbone is composed entirely of carbon atoms they may all be used satisfactorily provided only that the envisaged use of the polymer diazomethylene is not in a system that may cause degradation of the polymer backbone.

Polymeric systems may be prepared by solution, suspension or emulsion polymerisation and in such polymerisations the reaction will be terminated when the desired molecular weight has been reached. A wide range of molecular weights may be used and in the case of uncross-linked polymers may be for example, be up to 500,000, e.g. in the range 200 to 200,000.

When a gel copolymer, e.g. styrene-divinylbenzene, is used in bead form the optimum bead size is dependent on the use to which the polymer diazomethylene is being put. For example, in the case of styrene-2% divinylbenzene copolymer, the best loadings of diazomethylene groups are usually obtained with polymers of mesh size between 80 and 400, e.g. 80–170 and 200–400. Such polymers are especially useful in polymer-supported syntheses, particularly in syntheses where intermolecular reactions are not a problem. In those syntheses where intermolecular reactions are a problem lower loadings of diazomethylene groups can be arranged on the fine mesh size polymers or, alternatively, larger mesh size polymers, e.g. 20–50, may be used. Large mesh size beads are usually more difficult to functionalise to a high loading of diazomethylene groups.

In general, where a solid polymer is employed, features such as the degree of any cross-linking will be determined at least in part by the intended use for the polymer. Thus in many applications it is desirable to swell the polymer during reaction by use of a suitable solvent in order to expose reactive sites deep in the polymer matrix and enhance the efficiency of the reaction, and the polymer should be chosen with such requirements in mind.

The degree of loading of diazomethylene groups on the polymer will also be governed by the intended use. Thus in applications involving the binding of long or complex molecules to the polymer it may be preferred to employ polymers with widely spaced diazomethylene groups in order to minimise intermolecular interactions between the bound molecules, whereas in applications where comparatively small molecules are bound to the polymer it will often be preferable to employ polymers with a high loading of diazomethylene groups in order to make optimum use of plant, solvents etc. Where polystyrene-based reactive polymers are used in applications not involving the binding of long chain or large molecules, we generally prefer that at least 20%, preferably at least 30–50% of the polystyrene phenyl rings carry diazomethylene groups. In some uses of polystyrene-based polymer diazomethylenes 100% of the polystyrene phenyl rings may carry diazomethylene groups, though at such loadings considerable differences in reaction rates between the most remote sites and the most accessible sites in the polymer matrix may have to be taken into account.

The polymer diazomethylenes of the invention may be prepared by any convenient method. In general their preparation will involve polymerisation or copolymerisation of a suitably functionalised monomer or functionalisation of a polymeric material, followed by conversion of the functional groups to diazomethylene groups. This conversion of the functional groups may be effected by known methods for the formation of diazomethylenes, diazoketones, diazoesters and diazosulphones.

One such method involves preparation of a polymer containing aldehydic or ketonic oxo groups, reacting this polymer with hydrazine to form the corresponding polymer hydrazone possessing a plurality of groups $>C=N-NH_2$ and converting this to the polymer diazomethylene by oxidative treatment. Such oxidative methods of preparations are of value in that stable, accessible materials are employed. The oxidising agents previously described for the oxidation of hydrazones, e.g. mercuric oxide, manganese dioxide, nickel peroxide and lead tetraacetate are both expensive and of limited value inasmuch as penetration of a solid insoluble oxidant into the solid polymer matrix is difficult to induce. Furthermore, these oxidants often require careful preparation to ensure that they exhibit reproducible activity.

An oxidative technique for converting hydrazones to diazomethylenes which overcomes these disadvantages is treatment of the polymer hydrazone with an oxidising agent comprising an organic peracid, e.g. peracetic acid or m-chloroperbenzoic acid; periodic acid; a hypohalous acid of hypohalite salt or ester, e.g. hypochlorous acid, sodium hypochlorite or t-butylhypochlorite; chromic acid; or chlorine or bromine, which may be used in elemental form or in an activated form, as in compounds which possess a source of positive halogen ions, such as an N-halo-amide or -imide (e.g. an N-chloroimide such as N-chlorosuccinimide) or an N-halosulphonamide (e.g. an N-chloroarylsulphonamide such as chloramine T or N-chlorosaccharin); peracetic acid is a particularly preferred oxidising agent in this process. Mixtures of the oxidising agents, e.g. a combination of a peracid and an N-halo-amide or -imide, may also be used.

If desired, peracids may be formed in situ (e.g. from hydrogen peroxide and hexafluoroacetone.

The oxidation is preferably effected under basic conditions and is advantageously carried out in the presence of an oxidation catalyst, particularly when the oxidising agent is an organic peracid. Oxidation catalysts include iodine and iodides, e.g. ammonium iodide or a quaternary ammonium iodide; iodonium salts such as iodine bromide; quinones, e.g. benzoquinones such as tetrachlorobenzoquinone; and metal cations, e.g. copper I and II, cobalt II and III, nickel II, and manganese II, III and IV. Iodine and iodide catalysts are particularly preferred by virtue of the enhanced yields of polymer diazomethylene which may be obtained by their use.

Both inorganic and organic bases may be used in the above process, organic bases generally being preferred by virtue of their greater solubility in the more commonly employed solvent systems. The base need not be inert to the oxidising reaction conditions provided that the oxidation product of the base is itself capable of oxidising the polymer hydrazone, preferably without loss of efficiency.

In general, inorganic bases which may be used include alkali metal and alkaline earth metal hydroxides, bicarbonates and carbonates, e.g. sodium or potassium hydroxide, bicarbonate or carbonate, or calcium carbonate. When aqueous inorganic bases are used it is preferable to add a phase transfer catalyst.

Organic bases for use in the process are desirably substantially inert to the oxidising conditions, since such bases will generally not react to give a further oxidising species. Thus suitable based include substantially non-oxidisable nitrogen bases such as guanidines, e.g. tetramethylguanidine carbonate; quaternary ammonium hydroxides such as a tetra-n-butylammonium hydroxide; quaternary ammonium carbonates such as guanidinium carbonate, and basic amides such as dimethylacetamide. Such bases may generally be employed in solution or suspension in the organic solvent and water may be excluded from the reaction system. It may be convenient to use a water-soluble organic base which can be removed after the oxidation by aqueous washing.

It will be appreciated that when the oxidising agent is itself a base (e.g. chloroamine-T) the presence of an additional base may be unnecessary.

The oxidation reaction is exothermic and may, for example, be effected at a temperature in the range −50° to +150° C, preferably −15° to +30° C.

The oxidation is conveniently effected in an organic solvent, which is advantageously but not necessarily inert. Mixtures of solvents may also be used. Suitable solvents include chlorinated hydrocarbons, e.g. chloroform, 1,1-dichloroethane, methylene chloride or tetrachloroethylene; aromatic hydrocarbons, e.g. toluene or tetraline; aliphatic esters, e.g. ethyl acetate or butyl acetate ketones, e.g. acetone or methyl isobutyl ketone; aliphatic hydrocarbons, e.g. n-hexane or cyclohexane; aliphatic and cyclic ethers, e.g. diethyl ether or tetrahydrofuran; nitriles, e.g. acetonitrile; alcohols, e.g. butanol or octanol; and N,N-disubstituted amides, e.g. dimethylacetamide. Alternatively, the reaction may be effected in an aqueous reaction medium, preferably a mixture of water and a water-immiscible organic solvent capable of swelling the polymer.

The process is conveniently carried out by adding the oxidising agent to a mixture of the polymer hydrazone and the base in solution or suspension in a suitable organic liquid or aqueous medium, the rate of addition of the oxidising agent and the thermal control preferably being such as to maintain the temperature of the reaction mixture in the range −50° to +150° C. Other modes of addition may also be employed, however; thus, for example, the base and the oxidising agent may be added simultaneously to a suspension of the polymer hydrazone. Where the various components are brought together in organic solvents it is preferred that the solvents should be the same.

The reaction is conveniently effected using 0.5–2.0, e.g. 0.9–1.5 moles of oxidising agent per mole of hydrazone groups in the polymer, a preferred range for the oxidising agent being 1.0–1.4 moles per mole of hydrazone groups. Where an acidic oxidising agent is used we prefer to add sufficient base to the reaction mixture to neutralise all the acid present and/or any acid which may be produced during the oxidation; thus, for example, in cases where a solution of peracetic acid in acetic acid is employed as oxidising agent we prefer to neutralise both acids fully by the addition of base.

When an oxidation catalyst is used, the required level is generally very low, usually from $10^{-1}$ to $10^{-6}$, advantageously from $10^{-2}$ to $10^{-4}$ moles per mole of hydrazone.

While we do not wish to be bound by theoretical considerations it is believed that the presence of base enhances the yields of polymer diazomethylene by binding any acids present in or produced by the oxidising agent which would otherwise tend to react with the polymer diazomethylene leading to its decomposition. The base is also thought to moderate the oxidation reaction, reducing any tendency for the polymer diazomethylene to be oxidised further to, for example, corresponding carbonyl derivatives.

In certain cases, e.g. when low reaction temperatures, such as in the range $-50°$ to $-20°$ C, are employed to moderate the reaction rate, it may be possible to dispense with the presence of the base during oxidation of the polymer hydrazone, either adding base subsequently to stabilise the polymer diazomethylene product or rapidly removing the reaction solutions from the polymer to prevent further reaction.

A particularly convenient technique for the oxidation of polymer hydrazones comprises reacting the polymer hydrazone in a chlorinated hydrocarbon solvent such as methylene chloride with an acetic acid solution of peracetic acid, the reaction being carried out in the presence of tetramethylguanidine as base and the reaction solution containing a trace of iodine as catalyst. Reaction temperatures in the range $-10°$ to $+10°$ are conveniently employed, although with careful control of the addition of reagents it is possible to conduct the reaction at room temperature or above.

In many cases the formation of polymer diazomethylene will be accompanied by a marked colour change in the reaction system, for example by development of a pronounced magenta colour when both valencies of the diazomethylene group are attached to phenyl rings. In general the reaction may be monitored by I.R. spectroscopy (e.g. using potassium bromide discs), the formation of polymer diazomethylene being characterised by the appearance of a strong absorption in the region 2000–2150cm$^{-1}$. After cessation of the reaction the polymer diazomethylene may be separated, e.g., by filtration, washed and dried e.g. using a vacuum oven. We have found that polymer diazomethylene obtained in this way may be stored for several weeks, in the dark at 0°–5° without significant loss of activity.

The polymer hydrazone intermediates are conveniently prepared by treating the oxo-substituted polymer with hydrazine or an addition salt or solvate thereof, e.g. the hydrochloride or hydrate, advantageously by heating, preferably refluxing, the reagents in an organic solvent. Particularly suitable solvents for the preparation of styrene-based polymer hydrazones include alkanols, particularly butanl-ol; and heterocyclic solvents, particularly pyridine. Other solvents include hydrocarbon solvents such as benzene or petroleum spirit, diols such as ethylene glycol or butane-1,3-diol; cyclic ethers such as dioxan or tetrahydrofuran and N,N-disubstituted amides such as dimethylformamide or dimethylacetamide.

Polymer hydrazones are thus of value in that they may be used in the preparation of novel polymer diazomethylenes according to the invention. Moreover, polymer hydrazones are themselves reactive polymers and, in appropriate circumstances, may be used as polymer esterifying agents in analogous manner to that described above with reference to polymer diazomethylenes as is described in our U.S. Patent application Ser. No. 493,149 filed July 30, 1974.

In British Pat. No. 497,031 there are described products obtained by reacting polymeric substances containing oxo-groups with nitrogen bases including hydrazine. The products obtained have basic properties and are said to be of use in the textile industry where they may be combined with the fibre or with the fabric to give certain effects, particularly dyeing effects. The products described in British Pat. No. 497,031 are all soluble in dilute aqueous acids and in part in organic solvents, a necessary requirement for their intended use by impregnation into fibres or fabrics. Such solubility, however, is a disadvantage in polymer hydrazones intended for use as polymer esterifying agents or for the preparation of polymer diazomethylenes, in that the polymer cannot simply be separated from liquid media by the simple methods described above. According to a further feature of the invention, therefore, we provide polymer hydrazones possessing a plurality of groups $>C=N-NH_2$ and which are insoluble in dilute aqueous acid in contrast to the polymers of British Pat. No. 497,031. The polymers will in general be insoluble in all solvents, including polar and non-polar organic solvents but for the sake of clarity in defining the invention, bearing in mind the difficulty of establishing that no solvent for the polymer exists, we have adopted as a criterion the above mentioned insolubility in dilute aqueous acid, that is in aqueous acid of less than normal (1N) strength.

The insolubility of the polymer hydrazones according to the invention and, incidentally, the polymers containing oxo groups from which they are prepared as well as polymer diazomethylenes derived therefrom (which are generally preferred), is inherent in the character of the polymer backbone. The combination of the degree of cross-linking and the molecular weight resulting during the peparation of the polymer serves to ensure that, during transformations such as reaction with hydrazine to form the the polymer hydrazone, oxidation to form polymer diazomethylenes and subsequent use of the polymer diazomethylene the polymers retain their insolubility.

Apart from the aqueous media mentioned above, the polymer hydrazones according to the invention and, of course, any polymer diazomethylenes prepared from them, will be insoluble in ketones such as acetone; alkanols, including glycols and glycol monoethers; heterocyclic solvents such as pyridine; hydrocarbon solvents such as benzene or petroleum ether; cyclic ethers such as dioxan; acyclic ethers such diethyl ether and N,N-disubstituted amides such as dimethylformamide. By the term "insoluble" we mean, of course, that the polymer remains as a separate phase even if some swelling or other solvent-interaction takes place.

The oxo-substituted polymers from which the above hydrazones are prepared may themselves be prepared according to methods known per se. Thus, for example, polymers containing aromatic groups in the repeating units may be acylated by treatment with an acid halide in the presence of a Lewis acid such as aluminium chloride, boron trifluoride, antimony pentachloride, ferric chloride, stannic chloride or zinc chloride. Alternatively a polymer containing free carboxylic acid groups (e.g. obtained by full or partial hydrolysis of a polymer containing esterified carboxy or carboxamide substituents on the polymer chain or of a polymer containing ester or amide linkages) may be converted to the corresponding acid chloride; this can be used to acylate an aromatic substrate using similar Lewis acid catalysts, thereby yielding a polymer containing an aroyl grouping or can be reacted with an aliphatic organometallic reagent such as an alkyl cadmium, to yield an aliphatic acyl grouping. Carboxyl groups may introduced into aromatic polymers such as polystyrene by a Friedel-Crafts acylation with a carbamyl halide such as diphenylcarbamoylchloride, followed by hydrolysis.

The above-described Friedel-Crafts acylations are conveniently carried out in an organic solvent. Nitrobenzene or carbon disulphide are commonly employed as solvent in such acylations but these suffer the disadvantages that nitrobenzene is toxic and may be difficult to remove from the oxo-substituted polymer product, while carbon disulphide is highly inflammable and malodorous. These disadvantages may be overcome by employing a halogenated hydrocarbon solvent such as tetrachloroethylene, or a chlorinated benzene for the acylation reaction.

Oxo-substituted polymers may also be prepared by addition or condensation of a keto-containing reagent to or with an appropriately functionalised polymer. Thus, for example, polymers, containing free hydroxyl groups may be reacted with compounds such as p-acetylbenzyl chloride, phenacyl chloride or vinyl methyl ketone. Oxo-substituted polymers may of course also be prepared by polymerisation or copolymerisation of monomers containing such oxo-groups.

Thus, for example, a homopolymer or copolymer containing units derived from a vinyl ketone such as methyl vinyl ketone will possess ketonic side chains as, for example, in copolymers of styrene and methyl vinyl ketone.

Polymers carrying oldehyde groups are also available for example, poly (p-formylstyrene) which may be prepared by the method of J. T. Ayres and C. K. Mann (J. Polymer Sci., Polymer Letters 1965, 3, 505). A further method of obtaining oxo-substituted polymers is by oxidation. This approach is particularly useful when the grouping which is oxidised lies between two aromatic rings as in polybenzyl or poly α-hydroxylbenzyl. Thus the methylene groups of polybenzyl can be conveniently oxidised with aqueous nitric acid, e.g. 30-50% $HNO_3$, at reflux to give a polymer containing a substantial proportion of keto groups.

Polymer diazoketones and polymer diazoesters may be prepared by methods useful in the synthesis of their monomeric counterparts. Thus diazoketones can be produced by reacting a polymer acid chloride with a diazoalkane, e.g. diazomethane. Correspondingly, polymer diazoesters may be obtained by the reaction of nitrosating agents, e.g. isopropyl nitrite, on polymer aminoesters.

In the steps leading to the polymer diazomethylenes, slow diffusion of the reagents through the polymer matrix may necessitate the use of extended reaction times. This can be mitigated to some extent by carrying out the reactions in solvents which promote swelling of the polymer. In general, the solvents employed will depend on the nature of the polymer to be treated; useful solvents for the treatment of polystyrenes, for example, include halogenated hydrocarbons, e.g. chlorinated aliphatic hydrocarbons such as chloroform or methylene chloride and chlorinated aromatic hydrocarbons such as chlorobenzene; aromatic hydrocarbons such as benzene or toluene; heterocyclic solvents such as pyridine or dioxan; alkanols such as butanol or octanol; esters such as butyl acetate or methyl benzoate; ketones such as methyl ethyl ketone and higher homologues; and N,N-disubstituted amides such as dimethylformamide. It will be appreciated that the solvent chosen for a particular reaction should be compatible with the reaction system.

It will further be appreciated that the above described reaction stages in the synthesis of the polymer diazomethylenes may particularly readily be effected using a particulate of filamentary polymeric material retained in a column.

As indicated above, the polymer diazomethylenes of the invention are powerful alkylating agents and consequently are of value in a wide range of organic syntheses. Thus according to a further aspect of the invention there is provided a process for alkylating acid or hydroxyl or thiol groups in a substrate which comprises reacting said substrate with a polymer diazomethylene.

A useful degree of selectivity can often be achieved in alkylation reactions as demonstrated by the alkylation of 2-mercaptoethylamine hydrochloride. In this reaction alkylation takes place almost solely on the thiol group.

Reaction substrates which may be used in the above alkylation process include carboxylic acids, which react to form polymer-bound esters; alcohols, enols and phenols, which react to form polymer-bound ethers; and sulphur analogues of the above hydroxyl group-containing compounds.

Substrates containing weakly acidic hydroxyl or thiol groups do not generally react rapidly with polymer diazomethylenes. Furthermore, polymer diazoketones and polymer diazoesters do not usually react rapidly with carboxylic acids. In these cases, the rates of reaction between substrate and polymer diazomethylene can frequently be promoted by the addition of a catalyst, e.g. a Lewis acid or strong acid catalyst. Examples of useful catalysts include boron trifluoride, cupric acetate and p-toluenesulphonic acid.

Polymer diazomethylenes are thus of value as, for example scavenging agents in the removal of impurities or contaminants that may be alkylated from otherwise unreactive reaction solutions. The polymer diazomethylene reacts with the impurity so that the polymer bound impurity may be readily removed from the reaction solution.

Polymer diazomethylenes react at differing rates with carboxyl, hydroxyl and thiol groups and such differences in reaction rates may be exploited in the use of polymer diazomethylenes as scavenging agents. Similarly they may be used to support reagents or catalysts containing acid, hydroxyl or thiol group, this being of advantage in that contamination of the reaction product by the reagent or catalyst is minimised by virtue of the reagent or catalyst being retained by the polymer. Polymer diazomethylenes also represent easily handled sources of nitrogen which they yield upon heating, or upon contacting with acids, catalysts or oxidizing agents.

A particularly important application of the polymer diazomethylenes of the invention is as temporary protecting agents in organic syntheses, where an appropriately substituted reactive polymer may be used to bind a particular substrate throughout a series of chemical transformations. This technique is of advantage in that, inter alia, it facilitates separation of the substrate from various reagents and/or solvent which may be employed; thus, for example, a substrate bound to a solid polymer may readily be separated from a reaction solution by filtration, decantation or by simple withdrawal of the medium in cases where the polymer comprises a formed structure such as a fibrous array or is retained in a column, such separations generally being much more convenient than conventional separation techniques such as evaporation, precipitation, crystallisation or solvent extraction.

We generally prefer that the diazomethylene groups in polymer diazomethylenes to be used as temporary protecting agents are each bonded to at least one aromatic group since, as indicated above, this substitution pattern facilitates subsequent cleavage of polymer-bound substrates. Such "aromatic polymer diazomethylenes" are of value in, for example, the temporary protection of carboxylic acids, e.g. amino acids in the syntheses of peptides and of more complex and sensitive molecules such as penicillin and cephalospurin acids in the syntheses of β-lactam antibiotics, e.g. as described in out copending British Application No. 36386/73 (Reactive Polymers 2).

The following non-limitative Examples serve to illustrate the invention.

IR Spectra were determined on a Perkin Elmer Model 257, either as Nujol Mulls, KBr Discs, or chloroform solutions. Proton Magnetic Resonance Spectra were recorded on a Varian Model A60. Temperatures are in °C and all nitrogen volumes quoted are uncorrected.

EXAMPLE 1 a. Benzoylated Styrene - 2% Divinylbenzene Copolymer Styrene

2% divinylbenzene gel copolymer (Dow Chemical Co., 200–400 mesh, 20.0g; 80–170 mesh, 20.0g, 0.19 mole) was suspended in tetra chloroethylene (150 ml) at room temperature. To the stirred suspension were added powdered anhydrous aluminum chloride (14.0g, 0.105 mole) and benzoyl chloride (12.0 ml., 0.103 mole) and the mixture heated at 80°–85° for 5 hours. After cooling to room temperature, the mixture was filtered and the tan polymer washed with tetrachloroethylene (2 × 100 ml.) and pulled as dry as possible. The polymer was then stirred with 50% aqueous hydrochloric acid (200 ml.) for 30 minutes, collected by filtration, and washed successively with 50% aqueous hydrochloric acid (100 ml.), water (2 × 150 ml.), methanol (150 ml.), methylene chloride (2 × 150 ml.), methanol (100 ml.), water (100 ml.), 50% aqueous hydrochloric acid (100 ml.), water (2 × 100 ml.), methanol (100 ml.) and methylene chloride (200 ml.); and dried in vacuo at 50° overnight. The polymer products (200–400 mesh, 29.9g; 80–170 mesh, 29.8g) were pale yellow in colour and the IR spectrum of both exhibited a characteristic carbonyl absorption at 1661cm$^{-1}$. The polymer compositions were confirmed by microanalysis.

b. Hydrazone of Benzoylated Styrene - 2% Divinylbenzene Copolymer

Benzoylated styrene-2% divinylbenzene copolymer (200–400 mesh, 29.8g; 80–170 mesh, 29.7g) from example 1(a) was suspended in butan-1-ol (250 ml.), the stirred suspension treated with 99% hydrazine hydrate (50 ml., 1.0 mole) and the mixture heated under reflux for 24 hours. After cooling to room temperature, the product was filtered, washed successively with butan-1-ol (100 ml.), methanol (2 × 100 ml.), and methylene chloride (2 × 150 ml.); and dried in vacuo at 40° overnight. The title polymers (200–400 mesh, 31.0g; 80–170 mesh, 30.9g) were off-white in colour and the IR spectrum of both exhibited absorptions at 3410 cm$^{-1}$ (=N—NH$_2$) and 1657 cm$^{-1}$ (—C=N—). The polymer compositions were confirmed by microanalysis.

c. Polymer Diazomethylene from the Hydrazone of Benzoylated Styrene - 2% Divinylbenzene Copolymer The polymer hydrazone (200–400 mesh, 31.0g; 80–170 mesh, 30.9g) from example 1(b) was suspended in methylene chloride (200 ml.), and treated with 1,1,3,3-tetramethylguanidine (35.0 ml., 0.278 mole) followed by a 1% solution of iodine in methylene chloride (5.0 ml., 1.27 × 10$^{-4}$ mole) and the mixture cooled to −10°. Peracetic acid (20.0 ml., 0.114 mole, 38% w/w in glacial acetic acid) was then added dropwise over 30 minutes to the stirred suspension while the temperature of the reaction was maintained between 0° and −5°. Reaction was accompanied by an immediate colour change from white to deep magenta. After addition was complete the mixture was stirred for a further 30 minutes while allowing the temperature to rise to room temperature. The mixture was filtered and the product was washed with methylene chloride (3 × 200 ml.); and dried in vacuo at 20° overnight. The title products (200–400 mesh, 30.6g; 80–170 mesh, 30.5g) were deep magenta in colour and the IR spectrum of both exhibited the charcteristic diazomethylene absorption at 2038 cm$^{-1}$. The polymer compositions were confirmed by microanalysis.

d. Assessment of the Nitrogen Content of the Polymer Diazomethylene from The Hydrazone of Benzoylated Styrene - 2% Divinylbenzene Copolymer A stirred slurry of the polymer diazomethylene (200–400 mesh, 5.0g; 80–170 mesh, 5.0 g) from example 1(c) in chloroform (50 ml. containing 2% v/v ethanol) at room temperature was treated dropwise over 10 minutes with a solution of Pencillin C sulphoxide acid acetone solvate (8.0g; 1.958 × 10$^{-2}$ mole) in chloroform (50 ml. containing 2% v/v ethanol) in a closed apparatus. Reaction was immediate and the nitrogen evolved was collected by downward displacement of warer. Esterification was complete when the deep magenta colour had faded completely to a pale yellow colour, the nitrogen evolution having then ceased (200–400 mesh, 320 ml. nitrogen in 60 minutes; 80–170 mesh, 310 ml. nitrogen in 105 minutes). The mixture was stirred for a further 30 minutes and then filtered. The polymer ester was washed with chloroform (2 × 50 ml.) and dried in vacuo at 40° overnight. The products (200–400 mesh, 9.9g; 80–170 mesh, 9.86g) were pale yellow in colour. From the result of esterification the nitrogen content for the polymer diazomethylene products were: 200–400 mesh, 2.86 m.mole/g. of polymer; 80–170 mesh, 2.77 m.mole/g. of polymer.

EXAMPLE 2

Polymer Diazomethylene from the Hydrazone of Benzoylated Uncrosslinked Polystyrene The route of example 1(a), 1(b) and 1(c) describing the synthesis of polymer diazomethylene but using uncrosslinked polystyrene (molecular weight 10,000 BDH Ltd.) in place of styrene-2% divnylbenzene copolymer have the polymer diazomethylene from the hydrazone of benzoylated uncrosslinked polystyrene whose IR spectrum exhibited the characteristic diazomethylene absorption at 2040 cm$^{-1}$. Assessment of the nitrogen content following the method of example 1(d) above gave a nitrogen value of 0.27 m.mole/g. of polymer.

EXAMPLE 3

Polymer Diazomethylene from the Hydrazone of Benzoylated Isotactic Polystyrene

The route of example 1(a), 1(b) and 1(c) describing the synthesis of polymer diazomethylene but using isotactic polystyrene (Polyscience Inc., Cat. 2963, Lot no. 911-3) in place of styrene-2% divinylbenzene copolymer gave the polymer diazomethylene from the hydrazone of benzoylated isotactic polystyrene whose IR spectrum exhibited the characteristic diazomethylene absorption at 2040 cm$^{-1}$. Assessment of the nitrogen content of the product in a manner similar to example 1(d) above gave a nitrogen value of 0.29 m.mole/g. of polymer.

EXAMPLE 4

Polymer Diazomethylene from the Hydrazone of Benzoylated Macroreticular Polystyrene-Vinylbenzene Copolymer The route of example 1(a), 1(b) and 1(c) describing the synthesis of polymer diazomethylene but using macroreticular polystyrene-divinyl benzene copolymer (Rohm and Haas Ltd., XE-305, 16–50 mesh) in place of styrene-2% divinylbenzene copolymer gave the title polymer whose IR spectrum exhibited the characteristic diazomethylene absorption at 2038 cm$^{-1}$. Assessment of the nitrogen content of the product in a similar manner to example 1(d) gave a nitrogen value of 0.45 m.mole/g. of polymer.

EXAMPLE 5 a. Poly (Benzyl)

Benzyl chloride (20g) containing 0.02 moles per liter of stannic chloride was warmed at 35 degrees for 18 hours. During this time a stream of nitrogen was passed over the surface to remove hydrogen chloride.

The product was dissolved in dioxan (50ml) and poured into an excess of n-butanol (300ml) with stirring to precipitate the polymer. The product was filtered, redissolved in carbon tetrachloride (50ml) and then reprecipitated by pouring into methanol (300ml) the product was filtered and dried in vacuo. Yield 88% The molecular weight (number average) as determined by vapour phase osmometry using toluene as solvent was 4200. The molecular weight distribution (ratio of weight average to number average) as determined by gel permeation chromatography was 2.4 b. Poly (Benzoyl)

Poly (benzyl), (molecular weight ca. 4000, 1.0g) was heated under reflux in 30% aqueous nitric acid (50 ml.) for 16 hours. After cooling to room temperature, the polymer was extracted into methylene chloride (3 × 50 ml.). The combined extracts were washed with water (100 ml.), dried (MgSO$_4$), and evaporated under reduced pressure to a pale yellow foam which was dried in vacuo at 40° overnight. The IR spectrum of the product (1.15g) exhibited a strong carbonyl absorption at 1659 cm$^{-1}$ and NMR spectroscopy (CDCl$_3$) indicated at 42% oxidation of methylene to carbonyl groupings. The pale yellow foam (1.10g) was then heated under reflux in 10% aqueous sodium hydroxide solution (50 ml.) for 2 hours. After cooling to room temperature, the polymer was extracted into methylene chloride (3 × 30 ml.), the combined extracts washed with water (100 ml.), dried (MgSO$_4$) and evaporated under reduced pressure. The resultant foam was dried in vacuo at 40° overnight. The polymer product (0.98g) was orange in colour and whose IR spectrum exhibited the carbonyl absorption at 1659 cm$^{-1}$.

c. Hydrazone of Poly (Benzoyl)

Poly (benzoyl) (0.70g) from example (5(a) in butan-1-ol (25 ml.) was treated with 99% hydrazine hydrate (5.0 ml., 0.10 mole) and the mixture heated under reflux for 24 hours. After cooling, the reaction mixture was evaporated to dryness under reduced pressure. The tan foam was dissolved in methylene chloride (100 ml.) and the solution washed with water (2 × 50 ml.), dried (MgSO$_4$) and evaporated under reduced pressure. The resultant foam was dried in vacuo at 40° for 3 days. The polymer product (0.72g) was dark tan in colour, and the IR spectrum exhibited absorptions at 3400 cm$^{-1}$ (=N—NH$_2$) and 1652 cm$^{-1}$ (—C=N—).

d. Polymer Diazomethylene from the Hydrazone of Poly (Benzoyl)

The polymer hydrazone (0.60g) from example 5(b) was dissolved in methylene chloride (30 ml.) and th solution treated with 1,1,3,3-tetramethylguanidine (1.5 ml., 1.19 × 10$^{-2}$ mole) followed by a 1% solution of iodine in methylene chloride (0.1 ml., 2.54 × 10⁻⁶ mole) and the mixture cooled to −5°. Peracetic acid (0.5 ml., 0.28 × 10⁻² mole, 38% w/w in glacial acetic acid) was then added dropwise over 5 minutes while the temperature of the reaction was maintained between 0 and −5°. Reaction was accompanied by an immediate colour change from tan to bright red. After addition was complete the mixture was stirred for 30 minutes while allowing the temperature to rise to room temperature. The resultant bright red solution was washed with water (3 × 50 ml.): dried (MgSO$_4$) and evaporated under reduced pressure: and the polymer foam dried in vacuo at 20° overnight. The title product (0.57g) was bright red in colour and the IR spectrum exhibited the characteristic diazomethylene absorption at 2037 cm⁻¹. Assessment of the nitrogen content of the polymer diazomethylene in a similar way to example 1(d) gave a nitrogen value of 0.74 m.mole/g. of polymer.

EXAMPLE 6 a. Poly (Styrene-10% Methylvinyl Ketone)-2% Divinylbenzene Copolymer

An organic phase comprising 0.4g mols styrene, 0.1g mols methyl vinyl ketone, 0.01g mols divinylbenzene and 0.002g mols of benzoyl peroxide was suspended in 600 ml water, containing 2g polyvinyl alcohol as suspension stabiliser. The suspension was maintained by fast stirring and the temperature raised to 80° and held there for 18 hours. The polymer slurry was filtered, washed successively with water, ethanol and chloroform, and dried. The yield of desired polymer was 90%. The methyl vinylketone content of the polymer was shown to be approximately 10% by n.m.r.

b. Hydrazone of Poly (Styrene-10% Methylvinylketone)-2% Divinylbenzene Copolymer Poly (styrene-10% methylvinylketone)-2% divinylbenzene gel copolymer (5.0g. Polymer exhibits carbonyl absorption at 1705 cm⁻¹ in the IR spectrum) and 99% hydrazine hydrate (20.0 ml., 0.4 mole) in butan-1-ol (50 ml.) were heated under reflux with stirring for 21.5 hours. After cooling to room temperature, the polymer was filtered, washed successively with butan-1-ol (50 ml.), methanol (50 ml.), and methylene chloride (3 × 50 ml.), and dried in vacuo at 40° overnight. The title product (4.77g) was white in colour and the IR spectrum exhibited absorptions at 3400 cm⁻¹ (=N—NH$_2$) and 1700 cm⁻¹ (—C=N—).

c. Polymer Diazomethylene from the Hydrazone of Poly (Styrene-10% Methylvinylketone)-2% Divinylbenzene Copolymer The polymer hydrazone (4.75g) from example 6(a) was suspended in methylene chloride (75 ml.) and treated with 1,1,3,3-tetramethylguanidine (12.0 ml., 0.095 mole) followed by a 1% solution of iodine in methylene chloride (1.0 ml., 2.54 × 10⁻⁵ mole) and the mixture cooled to −5°. Peracetic acid (4.0 ml., 0.023 mole, 38% w/w in glacial acetic acid) was then added dropwise over 25 minutes to the stirred suspension while temperature of the reaction was maintained between 0° and −5°. Reaction was accompanied by a colour change from white to pale pink. After addition was complete the mixture was stirred for a further 30 minutes while allowing the temperature to rise to room temperature. The mixture was filtered, and the polymer was washed with methylene chloride (3 × 50 ml.), and dried at vacuo at 25° overnight. The title polymer (4.98g) was pink in colour and the IR spectrum exhibited the characteristic diazomethylene absorption at 2030 cm⁻¹.

d. Assessment of the Nitrogen Content of the Polymer Diazomethylene from the Hydrazone of Poly (Styrene-10% Methylvinylketone)-2% Divinylbenzen Copolymer A stirred slurry of the polymer diazomethylene (4.0g) from example 6(b) in chloroform (30 ml. containing 2% v/v ethanol) at room temperature was treated dropwise over 10 minutes with a solution of Penicillin G sulphoxide acid acetone solvate (5.0g., 9.77 × 10⁻² mole) in chloroform (50 ml. containing 2% v/v ethanol) in a closed apparatus. Nitrogen (27 ml.) was evolved over 15 minutes, the reaction mixture being stirred for a further 10 minutes. The polymer ester was filtered, washed with chloroform (2 × 50 ml.) and dried in vacuo at 40° overnight to give the polymer ester (4.67g) as a white solid. The nitrogen evolved represents a nitrogen content of the title polymer diazomethylene of 0.29 m.mole/g. of polymer.

EXAMPLE 7 a. N,N-Diphenylstyrenyl carboxamide-2% Divinylbenzene Copolymer (Modification of the Method of R. L. Letsinger et al.: J. Amer. Chem. Soc.: 1964, 84, 5163)

A suspension of styrene-2% divinybenzene gel copolymer (41.60g, 0.40 mole, 200–400 mesh, Dow Chemical Co.) in nitrobenzene (350 ml.) was stirred for 30 minutes at room temperature. Powdered anhydrous aluminum chloride (45.0g, 0.34 mole) was added followed by the dropwise addition of a solution of diphenylcarbamyl chloride (55.5g, 0.24 mole) in nitrobenzene (200 ml. over 30 minutes. The mixture was heated at 80°–85° for 2.5 hours, then the resultant dark brown suspension cooled to room temperature, treated with water (200 ml.) and stirred for a further 15 minutes. The reaction mixture was filtered and pulled as dry as possible. The polymer was hydrolysed on the filter by slurring with 50% aqueous hydrochloric acid (4 × 300 ml.) and then washed successively with water (4 × 400 ml.), methanol (3 × 300 ml.), methylene chloride (3 × 300 ml.), methanol (2 × 300 ml.), 50% aqueous hydrochloric acid (400 ml.), water (2 × 400 ml.), methanol (2 × 300 ml.) and methylene chloride (2 × 300 ml.), dried in vacuo at 40° to constant weight. The title polymer (68.72g, 65.19% substituted) was pale green-yellow in colour and exhibited ν max 1665 cm⁻¹ (C=O). (Found: C, 86.5, H, 6.6: Cl, 0.1, N, 2.8: Al, 0.06%). From microanalytical data the polymer contains 2.00 m.mole Ph$_2$NCO/g. of polymer. From weight gain the polymer contains 2.01 m.mole Ph$_2$NCO/g. of polymer.

b. Styrene Carboxylic Acid-2% Divinylbenzene Copolymer

The N,N-diphenylstyrenyl carboxamide-2% divinylbenzene copolymer from example 7(a) (53.0g) was heated with stirring at 130°–135° for 44 hours with a mixture of glacial acetic acid (670 ml.), concentrated sulphuric acid (500 ml.) and water (300 ml.). After cooling to room temperature, the mixture was filtered and the polymer washed successively with water (4 × 400 ml.), acetone (3 × 200 ml.); methanol (3 × 200ml.), water (2 × 400 ml.) and acetone (2 × 200 ml.); and dried in vacuo at 40° to constant weight. The title polymer (36.58g) was green in colour and exhibited ν max (NuJol) 1690 (C=O) and 3700–2400 (OH) cm$^{-1}$. Titration was effected by suspending the product (0.500g) in 95% ethanol (50 ml.) adding 0.5M sodium hydroxide (50 ml.), warming the mixture to reflux, cooling and back titrating with 0.5M hydrochloric acid using phenolphthalein as the indicator; it was found that 47.12 ml. of acid were required for neutralisation indicating 2.88 m.mole carboxyl/g of polymer.

c. Styrene Carbonyl Chloride-2% Divinylbenzene Copolymer

The styrene carboxylic acid copolymer (20.0g) from example 7(b) was refluxed with stirring for 2 hours in thionyl chloride (300 ml.) containing N,N-dimethylformamide (3.0 ml.). After cooling to room temperature the mixture was filtered and the polymer washed with chloroform (5 × 100 ml., containing 2% v/v ethanol): and dried in vacuo at 40° to constant weight. The title polymer (21.80g) exhibited ν max (Nujol) 1770 and 1738 cm$^{-1}$ (C=O) and was yellow-green in colour.

d. Benzoylated Styrene-2% Divinylbenzene Copolymer Resin

Powdered anhydrous aluminum chloride (4.0g; 0.03 mole) was added to a stirred slurry of the styrene carbonyl chloride polymer (10.0g) from example 7(c) in dry benzene (250 ml.). The mixture was heated under reflux for 5 hours and then cooled and filtered. The deep brown polymer was hydrolysed on the filter by slurrying with 50% aqueous hydrochloric acid (4 × 100 ml.). The polymer was then washed successively with 50% aqueous hydrochloric acid (100 ml.), water (4 × 100 ml.), methanol (3 × 100 ml.), and methylene chloride (3 × 100 ml.); and dried in vacuo at 40°. The title polymer (10.21g) was yellow-brown in colour and proved similar in all respects (IR, Microanalysis) to the type of product obtained in example 1(a).

e. Hydrazone from Benzoylated Styrene-2% Divinylbenzene Copolymer

In a manner similar to that of example 1(b) the benzoylated polymer (10.0g) from example 7(d) was converted to the title polymer (10.25g). The brown product polymer was similar to the type of product as obtained in example 1(b).

f. Polymer Diazomethylene from the Hydrazone of Benzoylated Styrene-2% Divinylbenzene Copolymer In a manner similar to that of example 1(c) the hydrazone polymer from example 7(e) (4.50g) was converted to the diazomethylene polymer. The magenta product (4.60g) was similar to the type of product from example 1(c). Assessment of the nitrogen content of the polymer diazomethylene in a similar way to example 1(d) above gave a nitrogen value of 1.84 m.mole/g. of polymer.

EXAMPLE 8

Polymer Diazomethylene Based on a Methylacrylic acid - Divinylbenzene Copolymer In an essentially similar series of reactions detailed above (example 7(c)→7(d)→7(e)→7(f), a methacrylic acid-divinylbenzene copolymer resin (Rohm and Haas, Amberlite IRC-50, H-form) was converted to the acid chloride (ν max (Nujol) 1780 (C=O) cm$^{-1}$). The polymer acid chloride was used in a Friedel-Craft substitution of toluene to give the ketone polymer (ν max (Nujol) 1695 (C=O) cm$^{-1}$) which was then converted to the hydrazone polymer (absence of C=O band in IR spectrum at 1695 cm$^{-1}$. ν max (Nujol) 1670 (—C=N—) cm$^{-1}$) and diazomethylene polymer (ν max (Nujol) 2030 cm$^{-1}$ (—C=N$_2$)

EXAMPLE 9

Polymer Diazomethylene from Styrene-2% Divinylbenzene Copolymer Having Increasing Levels of Substitution in the Copolymer In a manner similar to example 1(a), benzoylations on styrene-2% divinylbenzene copolymer gel (20.0g; 200–400 mesh, Dow Chemical Co.) using increasing amounts of benzoyl chloride and aluminum chloride gave benzoylated styrene-2% divinylbenzene copolymer resins (see Table 1). All the products exhibited the characteristic carbonyl absorption at 1661cm$^{-1}$ in the IR spectrum. Each benzoylated polymer was converted to the corresponding hydrazone in a manner similar to example 1(b), the polymer hydrazone having satisfactory IR absorptions. The polymer hydrazones were oxidised and the resultant polymer diazomethylenes assessed for nitrogen content in a similar manner to example 1(c) and 1(d). All the polymer diazomethylenes exhibited the diazomethylene absorption at 2038 cm$^{-1}$ in the IR spectrum. The nitrogen content obtained for each polymer diazolkane product is shown in Table 1. The composition for each ketone, hydrazone and diazomethylene polymer was confirmed by microanalysis.

Table 1

| Levels of Substitution and nitrogen content of polymer Diazomethylenes from Styrene - 2% Divinylbenzene Copolymer Resin | | | |
|---|---|---|---|
| Amount of Benzoyl Chloride Moles | Amount of Aluminium Chloride Moles | % Substitution Achieved at Benzoylation | Nitrogen Content of formed Diazomethylenes M.Mole/g. |
| 0.030 | 0.030 | 14.65 | 1.232 |
| 0.046 | 0.045 | 22.70 | 1.503 |
| 0.051 | 0.053 | 24.30 | 1.892 |
| 0.061 | 0.060 | 26.80 | 2.000 |
| 0.066 | 0.064 | 32.70 | 2.100 |
| 0.072 | 0.073 | 35.74 | 2.286 |
| 0.086 | 0.086 | 40.40 | 2.366 |
| 0.095 | 0.095 | 45.90 | 2.770 |
| 0.103 | 0.105 | 49.00 | 2.850 |
| 0.116 | 0.116 | 52.50 | 3.572 |
| 0.210 | 0.203 | 99.00 | 4.581 |

EXAMPLE 10

Polymer Diazomethylenes from Styrene-2% Divinylbenzene Copolymer Using Varying Acid Chlorides to Initially Substitute the Copolymer In a similar manner to example 1(a), ketone polymers of styrene-2% divinylbenzene copolymer gel (200–400 mesh, Dow Chemical Co.) using varying acid chlorides were prepared (see Table 2): The carbonyl absorption in the IR spectrum for each ketone polymer is shown. Each ketone polymer was converted to the corresponding hydrazone in a similar manner to example 1(b), the polymer hydrazones having satisfactory IR absorptions. The polymer hydrazones were oxidised and the resultant polymer diazomethylenes assessed for nitrogen content in a similar manner to example 1(c) and 1(d). The diazomethylene absorption in the IR spectrum and the nitrogen content for each polymer diazomethylene is shown also in Table 2. The composition of each ketone, hydrazone and diazomethylene polymer was confirmed by microanalysis.

Table 2

Polymer Diazomethylenes produced from the substitution of Styrene - 2% Divinylbenzene Copolymer with Varying Acid Chlorides

| Acid Chloride | % Substitution Achieved at ketone formation | IR absorptions cm$^{-1}$ | | Nitrogen Content of Polymer Diazomethylenes m.moles/g. |
|---|---|---|---|---|
| | | C=O of ketone | C=N$_2$ of diazoalkane | |
| Acetyl | 17.6 | 1679 | 2025 | 0.714 |
| o-methoxybenzoyl | 16.3 | 1661 | 2042 | 0.116 |
| m-methoxybenzoyl | 32.2 | 1651 | 2039 | 0.740 |
| p-methoxybenzoyl | 27.0 | 1649 | 2036 | 0.067 |
| o-methylbenzoyl | 24.0 | 1655 | 2040 | 0.669 |
| m-methylbenzoyl | 26.0 | 1655 | 2040 | 0.866 |
| p-methylbenzoyl | 23.5 | 1655 | 2038 | 1.000 |
| o-ethoxybenzoyl | 9.5 | 1659 | 2043 | 0.067 |
| m-ethoxybenzoyl | 27.5 | 1656 | 2041 | 0.330 |
| p-ethoxybenzoyl | 12.5 | 1653 | 2037 | 0.166 |
| 3,4-dimethoxybenzoyl | 15.0 | 1648 | 2037 | 0.101 |

EXAMPLE 11 a. Hydrazone of Poly (p-Fromylstyrene)-2% Divinylbenzene Copolymer

Poly (p-formylstyrene)-2% divinylbenzene copolymer gel (10.0g, 200–400 mesh, IR spectrum exhibited carbonyl absorption at 1695 cm$^{-1}$), prepared according to the method of J. T. Ayres and C. K. Mann (J. Polymer Science, Polymer Letters, 1965, 3, 505), and 99% hydrazine hydrate (10.0 ml., 0.206 mole) in butan-1-ol (100 ml.) were heated under reflux with stirring for 24 hours. After cooling to room temperature the polymer was filtered, washed successively with butan-1-ol (30 ml.), methanol (50 ml.), and methylene chloride (2 × 50 ml.), and dried in vacuo at 38° overnight. The title polymer (10.15 g) was buff in colour and the IR spectrum exhibited absorptions at 3380 cm$^{-1}$ (—N—NH$_2$) and 1669 cm$^{-1}$ (—C=N$_2$).

b. Polymer Diazomethylene from the Hydrazone of Poly (p-Formylstyrene)-2% Divinylbenzene Copolymer The polymer hydrazone (5.0g) from example 12(a) was oxidised in a similar manner to the method described in example 1(c) to afford the title polymer (4.9g) which was bright red in colour and the IR spectrum exhibited the diazomethylene absorption at 2056 cm$^{-1}$.

Assessment of the nitrogen content of the polymer diazomethylene in a similar manner to example 1(d) gave a nitrogen value of 0.296 m.mole/g. of polymer.

EXAMPLE 12

Polymer Diazomethylene from the Hydrazone of Benzoylated Styrene-2% Divinylbenzene Copolymer (200–400 mesh)

The polymer hydrazone (200–400 mesh) prepared as in example 1(b) was oxidised in a similar manner to example 1(c) using guanidinium carbonate (45.0g, 0.25 mole) in place of 1,1,3,3-tetramethylguanidine as the oxidation base. The magenta polymer so produced exhibited the diazoalkane absorption in the IR spectrum at 2038 cm$^{-1}$ and had a nitrogen content of 1.86 m.mole/g. of polymer.

EXAMPLE 13

Polymer Diazomethylene from the Hydrazone of Benzoylated Styrene-2% Divinylbenzene Copolymer (200–400 mesh)

A stirred slurry of the hydrazone of benzoylated styrene-2% divinylbenzene copolymer (3.0g) prepared as in example 1(b) in N,N-dimethylacetamide (50 ml.) was treated with a 1% solution of iodine in methylene chloride (0.5 ml., 1.77 × 10$^{-5}$ mole) and cooled to 0°. Peracetic acid (1.5 ml., 0.85 × 10$^{-2}$ mol) was then added dropwise over 5 minutes and then the reaction mixture allowed to attain room temperature and stirred for 40 minutes. The magenta polymer was filtered, washed with N,N-dimethylacetamide (50 ml.) and methylene chloride (2 × 50 ml.): and dried in vacuo at 25° overnight. The title polymer (3.0g) was deepn magenta in colour and the IR Spectrum exhibited the diazomethylene absorption at 2038 cm$^{-1}$.

Assessment of the nitrogen content of the polymer diazomethylene in a similar manner to example 1(d) gave a nitrogen value of 2.05 m.mole/g. of polymer.

EXAMPLE 14

Polymer Diazomethylene from the Hydrazone of Benzoylated Styrene-2% Divinylbenzene Copolymer (200–400 mesh)

A stirred slurry of the hydrazone of benzoylated styrene - 2% divinyl benzene copolymer (5.0g, 200 - 400 mesh) prepared as in example 1(b) in methylene chloride (50 ml.) was treated with a 1% solution of iodine in methylene chloride (1.0 ml., 2.54 × 10$^{-5}$) followed by a solution of sodium hydrogen carbonate (4.1g, 0.049 mole) in water (50 ml.). The stirred suspension was then treated with the phase transfer catalyst, 40% tetra-n-butylammonium hydroxide (3.0 ml., about 1.60 × 10$^{-4}$ mole), the mixture stirred for 1 minute and then cooled to 5°. Peracetic acid (3.5 ml., 0.020 mol, 38% $^w$/w in glacial acetic acid) was then added dropwise over 25 minutes while the temperature of the reaction was maintained between 3° and 8°. Reaction was accompanied by an immediate colour change from pale yellow to red together with effervescence. After addition the mixture was stirred a further 30 minutes while the temperature was allowed to rise to room temperature. The mixture was filtered and the product was washed with water (3 × 15 ml.) and methylene chloride (3 × 30 ml.); and dried in vacuo at 25° overnight. The title polymer (4.8 g) was pale magenta in colour and the IR spectrum exhibited the diazoalkane absorption at 2038 cm$^{-1}$. Assessment of the nitrogen content of the polymer diazomethylene in a similar way to example 1(d) gave a nitrogen value of 1.001 m.mole/g. of polymer.

EXAMPLE 15

Polymer Diazomethylene from the Hydrazone of Benzoylated Styrene-2% Divinylbenzene Copolymer (200-400 mesh)

The polymer hydrazone (5.0g) prepared as in example 1(b) was oxidised in a similar manner to the method described in example 14 using sodium hydroxide (2.0g, 0.05 mole) in place of sodium hydrogen carbonate. The resultant red polymer diazomethylene (5.0g) exhibited the diazomethylene absorption at 2038 cm$^{-1}$ in the IR spectrum and had a nitrogen content of 0.429 m.mole/g. of polymer.

EXAMPLE 16

Polymer Diazomethylene from the Hydrazone of Benzoylated Styrene-2% Divinylbenzene Copolymer (200-400 mesh)

A stirred slurry of polymer hydrazone (10.0g) prepared as in example 1(b) in methylene chloride (100 ml.) at room temperature was treated with a 1% solution of iodine in methylene chloride (1.0 ml., 2.54 × 10$^5$ mole) followed by 40% tetra-n-butylammonium hydroxide (1.0 ml., about 0.5 × 10$^{-4}$ mole). A solution of chloramine T (5.6g, 1.96 × 10$^{-2}$ mole) in water (100 ml.) was then added dropwise at room temperature over 15 minutes. No temperature rise was observed but the reaction mixture gradually turned red over 3 hours after which no further colour change was observed. The reaction mixture was filtered, and the product washed with water (2 × 100 ml.) and methylene chloride (2 × 100 ml.); and dried in vacuo at 25° overnight. The polymer (9.9g) was bright red in colour, the IR spectrum exhibited the diazomethylene absorption at 2038 cm$^{-1}$ and had a nitrogen content of 0.715 m.mole/g. of polymer.

EXAMPLE 17

Polymer Diazomethylene from the Hydrazone of m-Methoxybenzoylated Styrene-2% Divinylbenzene Copolymer A stirred slurry of the polymer hydrazone of m-methoxybenzoyl styrene-2% divinylbenzene copolymer (11.9g), prepared as in example 10, in methylene chloride (100 ml.) was treated with 1,1,3,3-tetramethylguanidine (5.4 ml., 4.29 × 10$^2$ mole) followed by a 1% solution of iodine in methylene chloride (2.0 ml., 5.08 × 10$^{-5}$ mole) and the mixture cooled to 0°. Peracetic acid (3.15 ml., 1.79 × 10$^{-2}$ mole, 38% w/w in glacial acetic acid) was then added dropwise over 10 minutes to the stirred suspension while the temperature was maintained between 0° and 5°. Reaction was accompanied by an immediate colour change from pale yellow to magenta. After the addition was complete the mixture was stirred for a further 30 minutes while the temperature was allowed to rise to room temperature. The mixture was filtered and the product washed with methylene chloride (3 × 75 ml.) and dried in vacuo at 25° overnight. The title polymer (11.85g) was magenta in colour and the IR spectrum exhibited the diazomethylene absorption at 2039 cm$^{-1}$. Assessment of the product for nitrogen content in a manner similar to example 1(d) gave a nitrogen value of 0.740 m.mole/g. of polymer.

EXAMPLE 18

Polymer Diazomethylene from the Hydrazone of m-Methoxybenzoylated Styrene—2% Divinylbenzene Copolymer The procedure for example 18 was repeated except that the use of the 1% solution of iodine in methylene chloride was omitted. The product was identical in all respects with that of example 17 except that it had a nitrogen content of 0.357 m.moles/g. of polymer.

EXAMPLE 19 a. Diazoacetylstyrene—2% Divinylbenzene Copolymer

To a stirred solution of diazomethane (9.66g, 0.23 mole) in dry ether (1250 ml.) maintained at 0° to −5°, was added a suspension of the styrene-carbonyl chloride polymer (10.0g) from example 7(c) in methylene chloride (50 ml.) over 15 minutes. Stirring was maintained for 5 hours at 0° to −5° and then for 16 hours at room temperature. The reaction mixture was filtered and the polymer washed with ether (2 × 100 ml.) and chloroform (2 × 100 ml.) and dried in vacuo at room temperature to constant weight. The title polymer (10.76g) was deep yellow in colour and the IR spectrum exhibited absorptions at 2100 (diazo) and 1610 (carbonyl) cm$^{-1}$. The composition of the polymer was confirmed by microanalysis.

b. Assessment of the Nitrogen Content of Diazoacetylstyrene—2% Divinylbenzene Copolymer To a mixture of tetrachloroethylene, glacial acetic acid (50 ml.) and cupric acetate (0.10g, 0.501 m.mole) heated to 55° in a constant temperature bath, was added in one portion the polymer diazoketone (2.0g) from example 19(a). Nitrogen (97 ml.) was rapidly evolved (1 minute). After 1 hour the reaction was cooled to room temperature and filtered. The polymer was washed with hot (60°-70°) glacial acetic acid (3 × 50 ml.), hot (60°-70°) water (3 × 50 ml.), acetone (3 × 50 ml.), methanol (3 × 50 ml.) and methylene chloride (3 × 50 ml.); and dried in vacuo at 40° overnight. The carbonylacetoxymethylstyrene polymer product (1.94g) was tan coloured, and exhibited absorptions in the IR spectrum at 1750 (—OCOCH$_3$) and 1695 (C=O) cm$^{-1}$. From the nitrogen evolved the polymer diazoketone contained 2.17 m.mole nitrogen/gm of polymer.

EXAMPLE 20

Polymer Diazoketone based on a Methacrylic Acid-Divinylbenzene Copolymer

In a manner similar to that of example 19(a) the acid chloride prepared from methacrylic acid-divinylbenzene copolymer (Rohm and Hass, Amberlite IRC-50, H form) (example 8) was treated with an excess of an ethereal solution of diazomethane. The resultant polymer diazoketone was yellow in colour and the IR spectrum exhibited absorptions at 2107 (diazo) and 1640 (carbonyl) cm$^{-1}$. An estimation of the nitrogen content of the polymer diazoketone was obtained in a manner similar to example 20(b). From the polymer diazoketone (2.0g) was obtained 120 ml. of nitrogen indicating that the polymer contained 2.68 m.mole nitrogen/g. of polymer.

EXAMPLE 21 a. Polymer Ester of N-Acetylglycine

A suspension of polymer diazomethylene (12.0g, containing 0.02 mole diazomethylene), prepared as in example 1(c) and N-acetylglycine (2.93 g, 0.025 mole) in chloroform (150 ml. containing 2% v/v ethanol) was stirred at room temperature for 24 hours. The reaction mixture was filtered, and the polymer washed with chloroform (4 × 400 ml.) and dried in vacuo at 30° overnight. The title polymer (15.31g) was pale yellow in colour and the IR spectrum exhibited absorptions at 3345 (NH), 1742 (O—CO—CH$_2$—) and 1660 (C=O) cm$^{-1}$. The composition of the polymer was confirmed by microanalysis.

b. Polymer Ester of N-Acetyl-N-Nitrosoglycine

A stirred suspension of N-acetylglycine diphenylmethyl polymer ester (10.0g) from example 21(a) in dry pyridine (100 ml.) at 5°–10°, was treated dropwise over 10 minutes with a solution of nitrosyl chloride (5.30g, 0.081 mole) in dry pyridine (25 ml.), when the reaction temperature rose from 5° to 9°. When additions was complete the mixture was stirred for 2 hours at 5°–10° and then for 16 hours at room temperature. The deep red reaction mixture was filtered, and the polymer washed with methylene chloride (3 × 100 ml.), acetone (2 × 100 ml), water (4 × 100 ml.), acetone (2 × 100 ml), and methylene chloride (3 × 100 ml.), and dried in vacuo at room temperature to constant weight. The title polymer (9.57g) was tan coloured and the IR spectrum exhibited absorptions at 1745 (—O—COCH$_2$—) and 1660 (C=O) cm$^{-1}$ (no NH present). The composition of the product was confirmed by microanalysis.

c. Polymer Ester of Diazoacetic Acid

A stirred suspension of the polymer ester of N-acetyl-N-nitrosoglycine (4.30g), from example 22(b) in methylene chloride (25 ml.), methanol (50 ml.), and water (0.4 ml.) at 0° to −5° was treated in one portion with barium oxide (2.30g, 0.015 mole), when the reaction temperature rose from 0° to 4°. The mixture was stirred for 2 hours at 0°–5° and then for 22 hours at room temperature and filtered. The polymer was washed with methanol (3 × 40 ml.), water (4 × 40 ml.), methanol (3 × 40 ml.) and methylene chloride (3 × 40 ml.); and dried in vacuo at room temperature to constant weight. The title polymer (3.92g) was light-brown in colour and the IR spectrum exhibited absorptions at 2107 (diazo) and 1690 (ester carbonyl) cm$^{-1}$. The composition of the product was confirmed by microanalysis.

d. Assessment of the Nitrogen Content of the Polymer Ester of Diazoacetic Acid A stirred suspension of the polymer ester of diazoacetic acid (1.0g), from example 22(c), in acetic anhydride (25 ml.) and chloroform (25 ml. containing 2% v/v ethanol) at room temperature was treated dropwise over 15 minutes with a solution of toluene-4sulphonic acid monohydrate (1.0g, 5.26 m.mole) in acetic anhydride (10 ml.) and chloroform (10 ml. containing 2% v/v ethanol). The nitrogen evolved (19 ml.) was collected by downward displacement of water. After stirring at room temperature for 3 hours the mixture was filtered, and the polymer washed with chloroform (3 × 40 ml.), methanol (2 × 40 ml.), water (3 × 40 ml.), methanol (2 × 40 ml.) and chloroform (3 × 40 ml); and dried in vacuo at 40° overnight. The polymer ester of p-toluenesulphonyloxyacetic acid (1.11g) was orange-brown in colour and the IR spectrum exhibited an absorption at 1740 (—OCO—). The nitrogen evolved gives the polymer diazoester from example 21(c) a nitrogen content of 0.848 m.mole/g. of polymer.

EXAMPLE 22

Polymer Ether of Allyl Alcohol

A stirred suspension of polymer diazomethylene from the hydrazone of benzoylated styrene-2% divinylbenzene copolymer (5.0g, 9.91 m.mole) prepared as in example 1 in chloroform (50 ml., containing 2% v/v ethanol) and allyl alcohol (50 ml.) at room temperature was treated with boron trifluoride etherate (0.5 ml., 0.56g, 3.98 mole). Nitrogen (238 ml.) was rapidly evolved (2 minutes) with the magenta colour of the reaction mixture discharging to pale yellow. The mixture was stirred for 1 hour at room temperature, filtered and the polymer was washed with allyl alcohol (2 × 50 ml.) and chloroform (4 × 50 ml.); and dried in vacuo at 40° overnight. The title polymer (5.58g) was golden yellow in colour. $\nu$ max (Nujol) 1060 (=CHOCH$_2$—)cm$^{-1}$. The composition of the polymer was confirmed by microanalysis.

EXAMPLE 23

Polymer Thioester of Thiophenol

In a similar manner to example 22 reaction with thiophenol in place of allyl alcohol gave the title polymer (5.66g). The composition of the polymer was confirmed by microanalysis.

EXAMPLE 24

Polymer Thioether of 2-Aminethanethiol Hydrochloride

In a similar manner to example 22 reaction with 2-aminoethanethiol hydrochloride in place of allyl alcohol gave the titled polymer (5.36g) as the hydrochloride, absorption max (Nujol) 3780–2500SB (NH$_3$+) CM-1. The composition of the polymer was confirmed by microanalysis. The polymer (3.75g) was washed with chloroform (50 ml, containing 2% v/v ethanol) and then with triethylamine-chloroform (1:9.3 × 30 ml, each wash lasting 3 minutes), the product was washed with chloroform (50 ml). Methanol (2 × 50 ml), water (2 × 50 ml), methanol (2 × 50 ml) and chloroform (2 × 50), and dried to constant weight in vacuo at 35° to give the polymer thioether of 2-aminoethanethiol (3.56g). Absorption max (Nujol) 3340 WB (NH) cm$^{-1}$. The composition was confirmed by microanalysis.

EXAMPLE 25

Polymer Ether of Methyl-3β-Hydroxy-11-oxo-5α-Bisnorcholanate

A stirred suspension polymer diazomethylene (3.0g, 5.94 m.mole) [prepared as in example 1] in methylene chloride (50 ml.) was treated with methyl-3β-hydroxy-11-oxo-5α-bisnorcholanate (2.03g, 5.40 m.mole) followed by boron trifluoride etherate (0.25 ml., 0.28g, 1.99 m.mole). Nitrogen was rapidlly evolved (1 minute) and the magenta colour of the mixture faded completely. After a further 1 hour at room temperature the mixture was filtered. The polymer was washed with diethyl ether (3 × 40 ml.) and methylene chloride (3 × 40 ml.); and dried in vacuo at 35° to constant weight.

The title polymer (3.19g) was golden yellow in colour.
ν max (Nujol) 1735, 1703 cm$^{-1}$ (carbonyl).

We claim:

1. A solid or gel polymer which is insoluble in dilute aqueous acid and possesses a plurality of hydrazone groups, >C=N—NH$_2$, wherein each hydrazone group either forms part of the polymer backbone chain or forms part of a side-chain attached to the polymer backbone chain in which case one of the valencies of each hydrazone group is linked to the polymer backbone chain and the other valency is bonded to an organic substituting group.

2. A polymer as claimed in claim 1 which is a solid polymer.

3. A polymer as claimed in claim 1 wherein the organic substituting group is an alkyl group containing 1 to 20 carbon atoms; an aryl group; a 5- or 6-membered heterocyclic ring containing 1 or more heteroatoms selected from O, N and S; heterocyclic substituted alkyl groups; unsaturated analogues of the above groups; or any of the preceding groups substituted by 1 or more halogen atoms, cyano, nitro, sulphone, oxo, esterified carboxy, alkyl or alkoxy groups.

4. A polymer as claimed in claim 1 wherein the plurality of hydrazone groups are randomly distributed along the length of the polymer.

5. A polymer as claimed in claim 1 wherein the hydrazone groups are linked to the polymer backbone through an alkylene or arylene group.

6. A polymer as claimed in claim 1 in which the backbone chain contains units derived from styrene.

7. A polymer as claimed in claim 6 which had been cross-linked by the presence of from 0.1 to 8% by weight of divinyl benzene.

8. A polymer as claimed in claim 6 wherein one of the valencies of each hydrazone group is linked to the polymer backbone chain through a phenyl group and the other valency is linked to a phenyl group which may be substituted by one or more alkyl or alkoxy groups.

* * * * *